Aug. 3, 1943. E. M. ARENTZEN ET AL 2,325,731
MINE HAULAGE VEHICLE
Filed Dec. 31, 1941 6 Sheets-Sheet 4
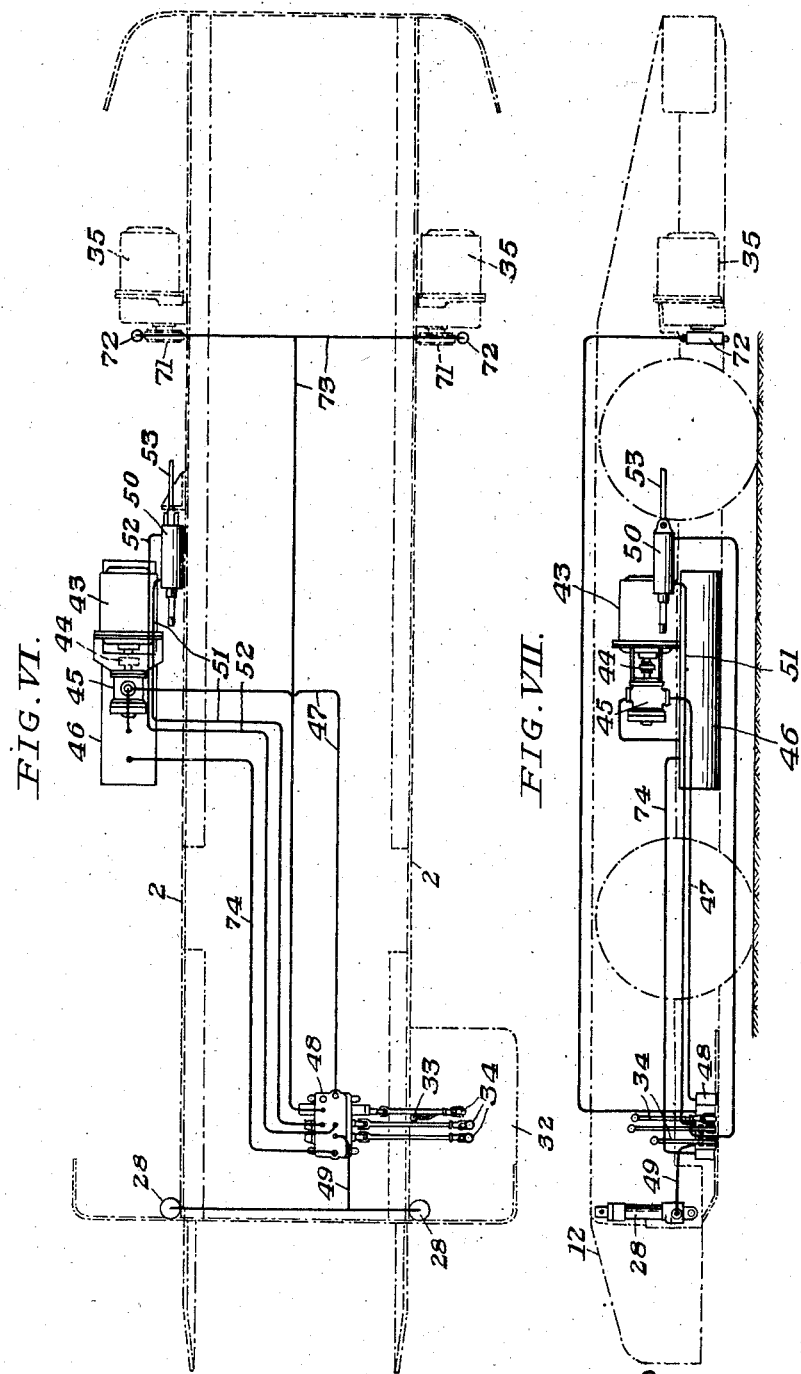
INVENTORS
Einar M. Arentzen
and Arthur L. Lee
by William B. Wharton
Their attorney

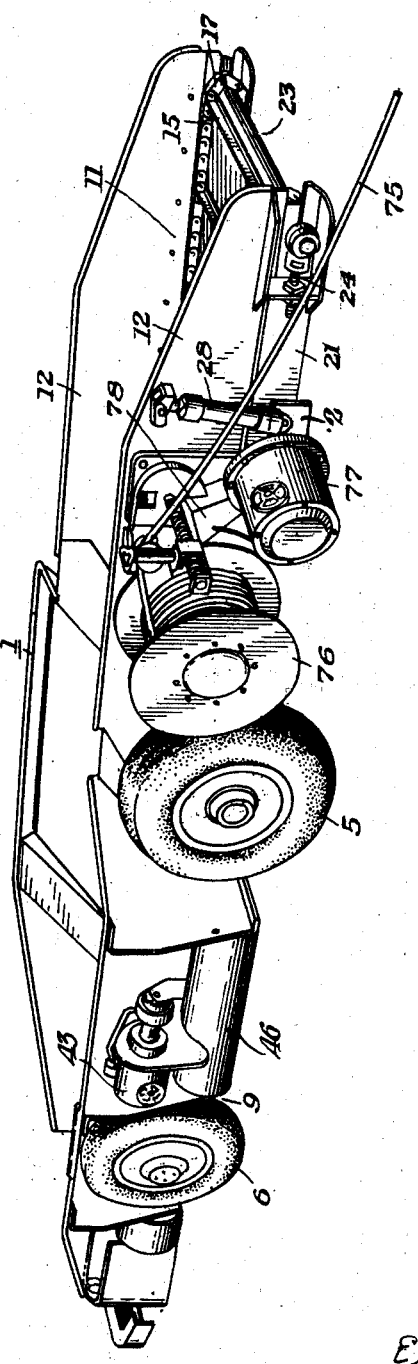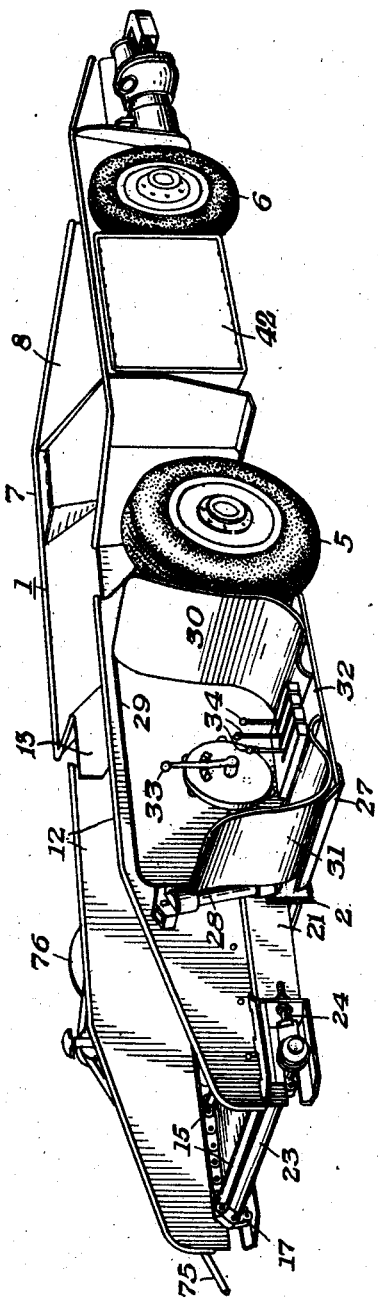

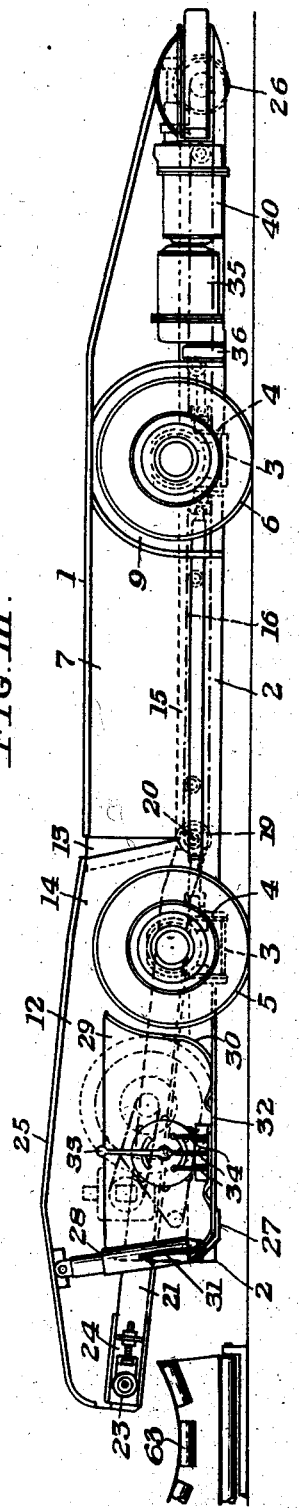

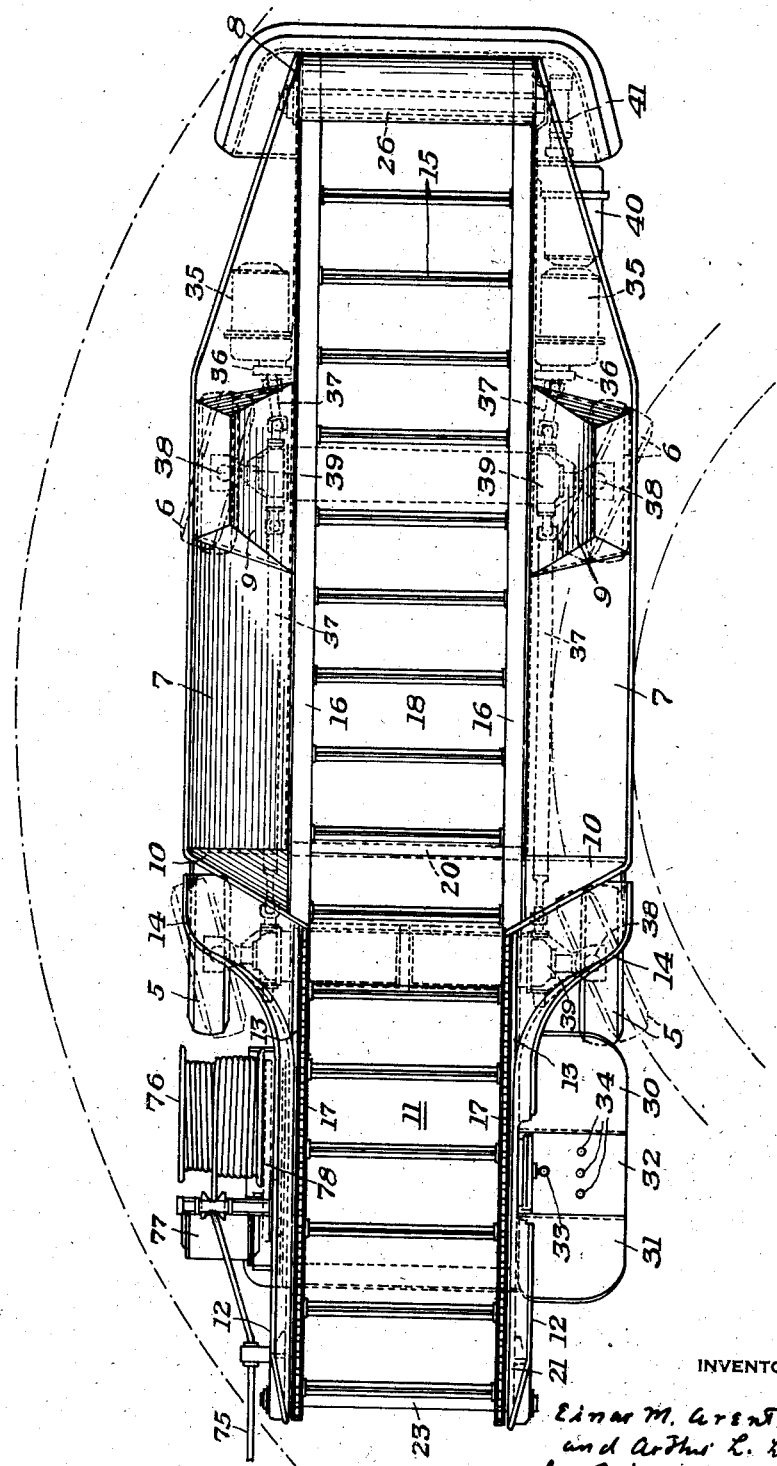

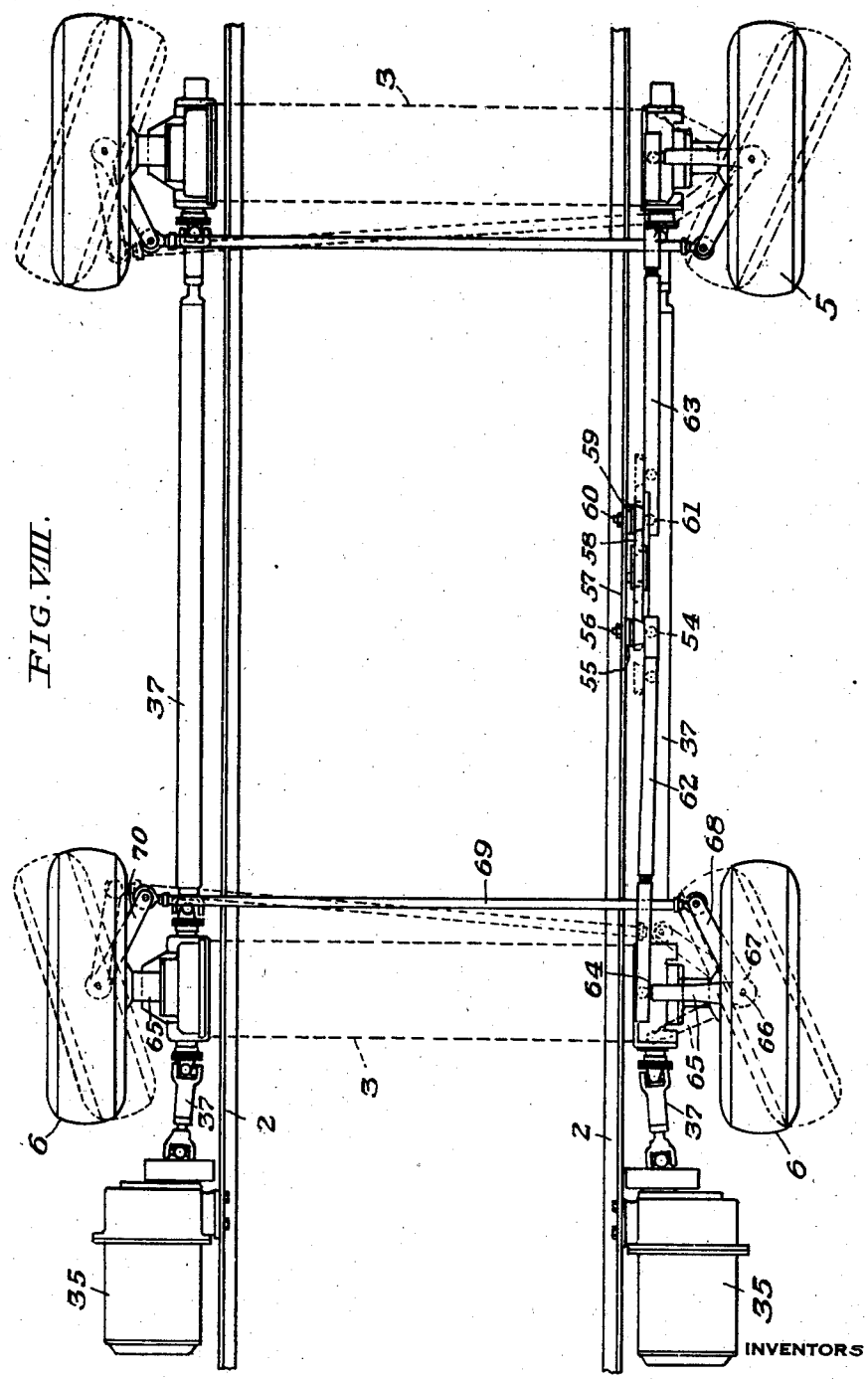

Aug. 3, 1943.  E. M. ARENTZEN ET AL  2,325,731
MINE HAULAGE VEHICLE
Filed Dec. 31, 1941  6 Sheets-Sheet 6
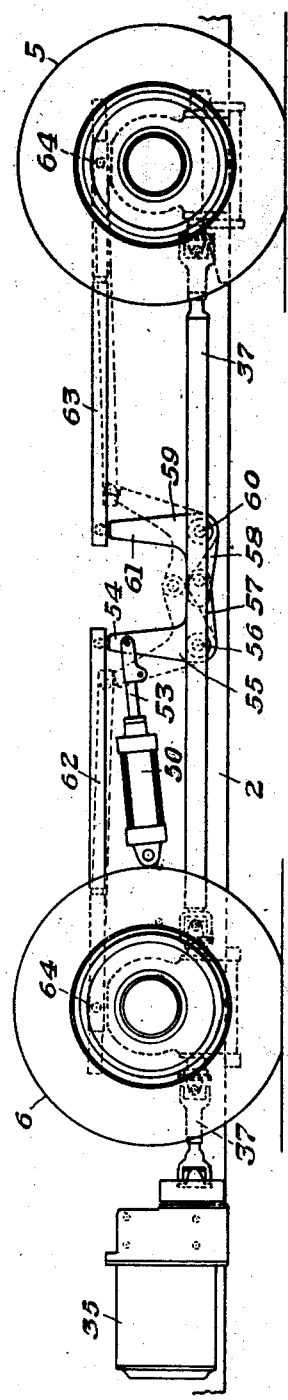
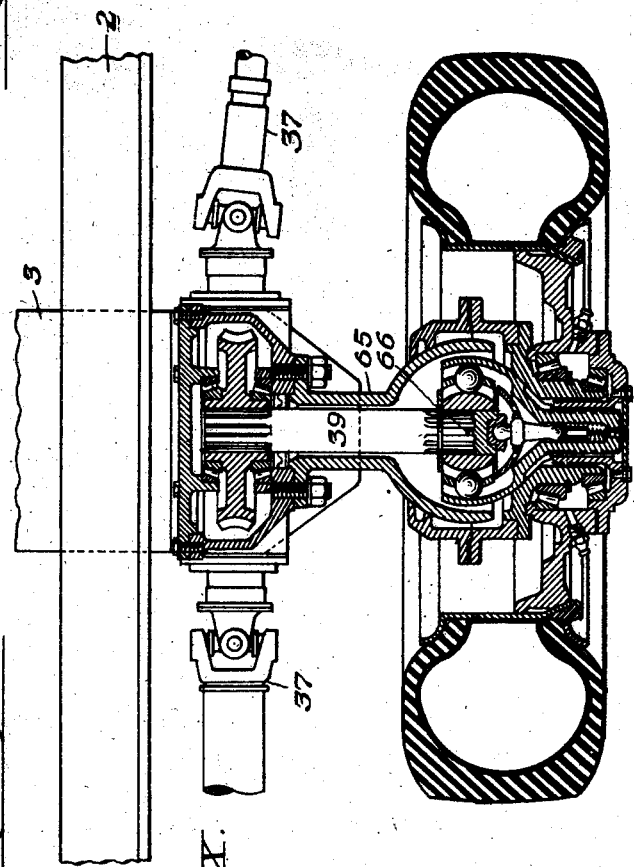
INVENTORS
Einar M. Arentzen and Arthur L. Lee
by William B. Wharton
their attorney Patented Aug. 3, 1943

2,325,731

UNITED STATES PATENT OFFICE 2,325,731

MINE HAULAGE VEHICLE

Einar M. Arentzen, Charleroi, and Arthur L. Lee, Oakmont, Pa., assignors to Joy Manufacturing Company, Franklin, Pa., a corporation of Pennsylvania Application December 31, 1941, Serial No. 425,114

2 Claims. (Cl. 214—83)

This invention relates to mine haulage vehicles, and is particularly devoted to structural arrangements of a self-unloading mine car organized so to limit the overall height of the car that the car may be used for coal haulage in low-seam mines.

In such mines the coal seams that are worked may be as low as 36", and removal of the coal taken from such seams presents a serious problem, by reason of the low ceiling. In such mines, it is customary to construct conveyor belt systems that extend along entries cut to heights greater than the height of the seam being worked. Such conveyor belts pass the entrances of the rooms so that coal brought from the rooms may be loaded upon the belts and by them transported to places of loading mine cars.

The object of the present invention is to provide a haulage vehicle in the nature of a shuttle car that is sufficiently low to enter the rooms of low-seam mines for the purpose of transporting coal from such rooms, and, additionally, the provision of means whereby unloading may be accomplished at a level sufficiently high to permit the car to unload itself directly to a belt conveyor or other form of conveyor or conveyance.

Another object is to provide a novel system of controls for such a vehicle that permits its convenient operation and that provides for positive control of the operating mechanism, the braking and the steering of the vehicle by the operator, and which controls are so arranged as to be readily operable under all conditions in which the vehicle may be used. Still another object is the provision of a novel arrangement of a bottom-forming conveyor and supporting means for such conveyor whereby the conveyor is hinged to permit a portion of it to be angularly movable to permit adjustment of the height of the discharge of a conveyor or other suitable carrier.

In the accompanying drawings:

Figs. I and II are perspective views showing opposite sides of the vehicle; Fig. I showing the side of the vehicle on which are mounted a cable reel, cable-reel motor and pressure cylinder as well as elements which are duplicated on the other side of the vehicle, and Fig. II showing in addition to duplicated elements supporting structure for the operator and control elements for the variously functioning elements of the vehicle assembly mounted therein.

Fig. III is a side elevation of the vehicle showing the side of the vehicle that is shown in Fig. II, showing a wheel driving motor and connections, and a conveyor actuating motor, and also illustrating an elevated position of a portion of a bottom-forming conveyor for discharging a load carried by the vehicle into an extraneous belt-type conveyor.

Fig. IV is an outline, rear-elevational view of the vehicle.

Fig. V is a plan view of the vehicle.

Figs. VI and VII are diagrammatic views, showing in plan and in elevation respectively a hydraulic control system and connections for controlling and actuating the brakes, steering elements, and the adjustable conveyor portion of the vehicle.

Fig. VIII is a plan view of the frame of the vehicle, showing the sources of driving power for the vehicle and the associated power-transmitting connections, and showing and illustrating the structure and action of the steering connections both along the sides of the vehicle and across the vehicle frame.

Fig. IX is a side elevation of the vehicle structure shown in Fig. VIII.

Fig. X is a horizontal-sectional detail view of the power-delivery structure immediately associated with the wheels of the vehicle.

Describing our invention with detail reference to the exemplary embodiment of the drawings, the body of the vehicle is designated generally by reference numeral 1, and is supported upon longitudinal frame elements 2 that are extended substantially the full length of the vehicle. Cross members 3 are extended transversely of the vehicle at longitudinally spaced points and support the longitudinal elements 2 with which they engage. Upstanding hanger brackets 4 are mounted at the ends of the cross members 3 and provide mountings for forward wheels 5 and rear wheels 6.

The body proper of the vehicle comprises cargo-space-enclosing walls 7 that are spaced laterally to substantially coincide with the outside surfaces of the rear wheels 6, and that extend longitudinally of the vehicle from a point immediately to the rear of the front wheels 5 to a point rearward of the rear wheels 6. The walls 7 taper inwardly and downwardly to provide a hopper-shaped cargo space, the major portion of which lies in the space between the forward and rear wheels and that is extended to the rear of the rear wheels. Preferably, the walls 7 taper inwardly toward the rear end of the vehicle from a point behind the rear wheels 6 to provide a narrow end structure (as at 8, for clearance purposes in turning the vehicle. The walls 7 are provided with pockets 9 for the reception of the rear wheels 6.

Arranged at the forward ends of the walls 7 and behind the forward wheels 5 are end walls 10, serving to constrict the transverse dimension of the cargo space to that of a delivery throat 11. The delivery throat 11 is enclosed between side walls 12 that advantageously are vertical and that extend from the forward end of the vehicle rearwardly to a point adjacent but spaced from the front walls 10 of the body proper. Short side wall structures 13 project forward from the end walls 10 of the vehicle body, in substantial alignment with the forward straight portions of the walls 12 and between the outwardly placed portions 14 of the latter walls.

The vehicle bottom, including the bottom of the cargo space and the delivery throat 11, is formed by a delivery conveyor structure. This conveyor structure consists primarily of cross-bars 15 extended into guide structures 16 extended as frame elements along both sides of the vehicle structure. The cross-bars, or travellers 15 interconnect endless conveyor chains 17. The upper reach of the moving assembly of the conveyor is underlaid by a bottom plate 18 on which the cross-bars or travellers 15 ride and which provides a supporting bottom for cargo in the vehicle body.

It will be seen that the longitudinal frame elements 2, the rear cross members 3, and the guide elements 16 and 18 form a conveyor-supporting frame. By reason of the mounting of the longitudinal elements 2 upon and in rigid relation to both of the cross elements 3, the mounting of the side walls 7 upon the longitudinal elements 2, and the mounting of the guides 16 and bottom plate 18 with the side walls 7, it will be apparent that the conveyor-supporting frame comprising these elements is rigid relative to the vehicle structure as a whole and lies in fixed, substantially horizontal position relative to the vehicle structure, similarly to support the movable elements of the conveyor.

Immediately to the rear of the front wheels 5, and arranged upon a vertical plane that is sub-substantially coincident with the plane of termination of the front walls 10 is a horizontal pivot structure 19. This pivot structure advantageously comprises a transverse horizontal shaft 20 mounted to the longitudinal elements 2. Upon this pivot structure are mounted, for vertical swinging, longitudinal frame elements 21. The elements 21, together with a forward cross member 22, constitute a conveyor-supporting frame that is pivoted to the vehicle structure by the shaft 20. A conveyor roller 23 is suitably journaled in the forward ends of these longitudinal members 21, and a takeup mechanism 24 is provided. The walls 12 are suitably secured to the longitudinal elements 21, and are provided at their top edges with a frame 25. The entire forward structure, of which the elements 21 constitute the main support, and which includes the forward portion of the movable conveyor structure, is capable of vertical swinging about the shaft 20 from a position in approximate planar extension of the fixed rearward structure. The forward frame structure 21 is bent at its point of crossing the forward transverse frame member 3 to give the structure the greatest possible clearance and permit it to be lowered over the transverse member.

Referring to Fig. III, it will be noted that the rear edges of the walls 12 of the forward conveyor structure are downwardly and rearwardly inclined to provide clearance for swinging movement between them and the walls 10 of the cargo space. When the forward conveyor structure is inclined upwardly, the guide members 16 overlying the side chains 17 of the conveyor serve to retain the chains and cross-bars forming the rearward portion of the conveyor in proper flat position at the bottom of the cargo space of the vehicle. At the rear of the vehicle, the conveyor chains 17 pass over a power roller 26, so that the conveyor is in one continuous length a portion of which is swingingly adjustable with respect to another fixed portion, the moving structure of the conveyor being driven as a unit in any position of the adjustable portion.

As indicated above, the longitudinal members 2 are extended substantially throughout the entire length of the vehicle and to a point spaced in advance of the forward cross member 3 and the front wheels 5. The forward ends of these longitudinal elements 2 are connected by a transverse member 27 which is, as indicated in Fig. III, preferably of a shoe-like configuration in cross section. In the lowered horizontal position of the forward conveyor structure such structure, being narrower than the true body structure of the vehicle, lies between the longitudinal members 2.

In order to control the position of the forward structure, and thereby adjust the height of the delivery point of the conveyor, lifting means are provided. Advantageously, these lifting means may be in the form of hydraulic cylinder assemblies 28, one of which is arranged upon each side of the vehicle, and the lower ends of which are pivoted to the respective longitudinal elements 2. The upper ends of these hydraulic cylinder assemblies 28 are pivoted in supporting relation to the side walls 12, adjacent the upper edges of such walls, and preferably in supporting relation to the frames 25.

The operator's station is supported upon one of the longitudinal elements 2 upon one side of the structure that forms the throat 11 and within the recessed area provided by the difference in widths between the said structure and the outer limits of the side walls 7. The operator's station comprises a vertical side plate 29 arranged alongside and parallel to one of the walls 12.

Plates 30, 31 and 32 are mounted to extend transversely from the plate 29, and these plates are shaped to provide back rests and seats facing in opposite directions recliningly to support the operator. A driving-motor control 33 is mounted upon the plate 29 midway between the plates 30 and 31 and in a position to be readily grasped and operated by an operator seated upon either of the plates, 30 or 31.

Approximately midway between the vertical portions of the plates 30 and 31 is a series of controlling levers 34, by means of which hydraulic controls for the brakes, the steering, and the lifting cylinders 28 are operated. These levers are arranged in a row that is substantially parallel to the longitudinal axis of the vehicle and they are spaced outward from the plate 29 at a point substantially midway the width of the plates 30 and 31, so that the operator may readily straddle the series with his legs when he is seated upon either of the plates, 30 or 31. In this way, the controlling levers are in the most convenient position for the operator, regardless of the direction in which he is facing.

By reason of the use of hydraulic controls which require a very small amount of motion for operation to apply relatively great power, the very low ceilings under which a vehicle of this type is used do not interfere with the proper manipulation of the controls, and cramped space does not interfere with absolute and accurate control of the vehicle as it does when more conventional types of control, such as a steering wheel and pedals, are used. It will be noted also that the arrangement of the operator's station is such that the operator may extend his head either above the car or to the side. An additional feature of the control arrangement is that the levers 34 are of such limited vertical extent that the operator may enter or leave the station very readily and quickly by swinging his inner leg over their tops.

The drive for the vehicle is arranged in substantial conformity with the disclosure of application of Arthur L. Lee, Serial No. 383,329, filed March 14, 1941, and comprises driving motors 35, one of which is mounted on each side of the vehicle for driving, respectively, the wheels upon that side of the vehicle. The drive is accomplished through gear reductions 36 and a system of shafts and universal points 37. The wheels 5 and 6 are all arranged for steering movement, being pivoted for such movement by spindle structures 38. Power take-off shafting and gearing 39 is arranged to drive each wheel from the longitudinal shafting system 37. The conveyor belt 15 is driven by a motor 40 mounted on the side of the car adjacent the rear end, and through a gearing system 41 driving the power roller 26 about which the conveyor is trained.

The operation of the motors 35 is controlled by power-controller 33 at the operator's station. The braking, steering, and elevation of the forward portion of the conveyor are all controlled by a hydraulic system. This system is shown in Figs. VI and VII, wherein the numeral 43 indicates a motor mounted at the side of the car and arranged through a gearing 44 to drive an hydraulic pump 45. The pump 45 draws fluid from a reservoir tank 46 and, by means of a pressure pipe line 47, delivers the fluid to an hydraulic control valve assembly 48. From the valve assembly 48 an operating pipe line 49 leads to the hydraulic cylinders 28 by means of which the forward conveyor structure is elevated. Steering of the vehicle is accomplished by steering cylinder 50, mounted upon the side of the vehicle. Operating pipe lines 51 and 52 lead from the valve assembly 48 to the cylinder 50 which they enter upon opposite sides of the piston within the cylinder so that delivery of pressure fluid through one of the pipes moves the piston in one direction, and delivery of fluid through the other pipe moves it in the opposite direction. The cylinder is connected by means of a rod 53 with a steering linkage by means of which the individual wheels are moved about their spindles in appropriate angular relation for steering. As indicated in Fig. V, the front and rear wheels are moved in angularly opposite directions so that steering is accomplished at both ends of the vehicle.

The steering system by means of which all four wheels are steered by the hydraulic cylinder 50 is so arranged that there is an automatic differentiation of steering angles of the wheels located on opposite sides of the vehicle. Referring particularly to Figs. VIII and IX, the piston rod 53 is connected to one arm 54 of a bell crank 55 which is pivoted at 56 to a longitudinal element 2 of the vehicle. The other arm 57 of this bell crank is connected to the corresponding arm 58 of an identical bell crank 59 that is pivoted at 60 to the element 2 in opposite arrangement to the crank 55. The arm 61 of the bell crank 60, which arm corresponds to the arm 54 of the bell crank 55, by reason of the interconnection of the bell cranks and their mounting, is moved by the rod 53. Drag links 62 and 63 are respectively connected to the arms 54 and 61 of the two bell cranks and are extended longitudinally of the vehicle and connected respectively with steering arms 64 of the front wheels 5 and rear wheels 6.

Referring particularly to Fig. X, it will be seen that the wheel mounting is such that there is a supporting housing 65 rigidly secured to the frame structure of the vehicle and which is extended in fixed right angular relation to the longitudinal axis of the vehicle. The wheel is mounted for steering movement about a fixed point 66 of the fixed housing 65, the wheel being carried by an angularly movable housing structure 67 that is pivoted to the housing 65, as disclosed in detail in application Serial No. 383,329. The steering arm is connected with the pivoted wheel housing structure 67 so that angular movement of the arm under the impulse of the drag link 62 results in angular motion of the wheel structure about the point 66 and, consequently, in steering adjustment of the wheel. The arm 64 is arranged at right angles to the line of travel of the wheels.

In order to provide for steering of the wheels on the opposite side of the vehicle, and to compensate for the difference in radius of the arc upon which those upon one side travel from that of the arc upon which the opposite wheels travel, a specialized cross-linkage is provided.

Upon the angularly movable wheel structure 67 is mounted an operating arm 68 that is extended from the structure at an inward angle. A transverse radius rod 69 connects the arm 68 with a similar arm 70 of the opposite wheel assembly, which latter assembly duplicates the one just described except for the absence of a drag link steering connection. The arm 70 is arranged in an inward angular relation to its assembly similar to that of the arm 68. By reason of the opposite angular arrangement of the inwardly extending interconnected arms 68 and 70, their arcuate travel, incidental to their steering movement, is differential. Thus movement of the arm 68 from its full line position to its dotted line position in Fig. VIII, an arcuate travel of 25°, will result in an arcuate travel of only 19° by the arm 70. Consequently, turning of the opposite wheels will be differential to compensate for the different radii of the arcs that they respectively travel upon. The differential ratio varies correctly according to the direction of turning, so that the inside wheel is steered at a sharper angle than is the outside wheel.

The steering mechanisms at the two ends of the vehicle are identical and, by reason of the identical character and operation of the bell cranks 55 and 59, any steering adjustment of the wheels at one end of the vehicle is duplicated by the wheels at the other end of the vehicle.

Braking of the vehicle is accomplished by brake assemblies 71, assembled with the power drive from the motors 35. These braking assemblies are operated by fluid pressure cylinders 72 and are connected with the valve assembly 48 by a pipe line 73.

Delivery of fluid under pressure to the various pipe lines is controlled by independent delivery valves within the assembly 48, these valves being of such character that when they are open to the respective pipe lines, pressure fluid is delivered from the supply line 47 to the respective delivery lines, while closing of the valves results in connection of the respective delivery lines to an exhaust line 74 that returns the fluid from the valve assembly 48 to the reservoir 43. Operation of the respective valve controlling delivery of fluid to the delivery pipe lines is accomplished by the control levers 34 at the operator's station.

Electric power for the operation of the various motors of the vehicle is supplied by a cable 75 that is wound on a reel 76 mounted beside the narrow forward structure of the vehicle on the opposite side from the operator's station. The reel 76 is driven automatically by a motor 77 through driving mechanism 78.

The hydraulic power system—including the motor 43, pump 44, and reservoir 45, and the steering cylinder 50—is mounted under the tapering side walls 7 of the main cargo portion of the vehicle, so that this mechanism is contained within the outermost dimensions of the vehicle. Upon the opposite side of the vehicle and under the inclined side walls 7 is an electric control system enclosed in a casing 42. This system contains the necessary relays and other equipment.

As indicated in the preliminary portion of the specification, the vehicle above described is useful in low-seam mine work. The vehicle is shown in Figs. I and II with its forward assembly in lowered position, in which condition the vehicle is run into the low-seam rooms and loaded. It is then driven to a point of delivery which desirably may be a conveyor system such as the belt conveyor indicated at 63 in Fig. III. For delivery to such belt conveyor the forward assembly of the vehicle is raised to a sufficient height to deliver to the surface of the belt, as shown in Fig. III.

Although the vehicle is disclosed as being used with a belt conveyor, it will be readily appreciated that it is not limited to such use. There is no rigid restriction to the angular adjustment of the forward portion of the vehicle to adjust the height to which it delivers its cargo. Such angular adjustment will, however, be practically limited by the limitations inherent in application of a delivery conveyor to a mine haulage vehicle. In this connection it is to be understood that the hinged conveyor assembly herein disclosed in a vehicle which is highly specialized in structure to the end of height limitation, has utility in and without substantial departure from its structural incorporation as herein shown, may be incorporated in a generally similar mine haulage vehicle of what may be considered normal height, such as the mine haulage vehicle disclosed in the application of Arthur L. Lee, Serial No. 383,331, filed March 14, 1941.

The use of hydraulic controls in a vehicle of this kind is peculiarly effective. It permits adequate operation by very small movements of the operating controls, so that cramped space cannot interfere with the management of the car. The use of hydraulic steering also prevents injury to the operator by bucking of a mechanical steering control, which has proved to be a very serious source of danger in mechanically steered vehicles of this type, due principally to the uneven character of mine floors and the presence of obstructions of considerable size, hidden by the thick bed of dust that normally is present in mines. The hydraulic control also permits powerful control of the braking and steering without requiring the exertion of a great deal of strength by the operator. This is important in a vehicle purposed to operate in low-seam coal, in which the position and movements of the operator of the vehicle are restricted severely by the scant headroom existing for operations.

Together with the hydraulic system for steering and braking and the system of steering linkage, the use of independent drives for the wheels upon opposite sides of the vehicle contributes to the compact nature of the vehicle whereby adequate and proper control is accomplished within the very confined spaces available in a vehicle of this nature. The arrangement of the respective longitudinal drive shafts upon opposite sides of the car reduces to a minimum the space that is necessary to accomplish driving. The provision of a single steering cylinder and a steering linkage along one side of the car, together with a transverse radius rod at each wheel assembly, also contributes to the simplicity that permits arrangement of all operating mechanism in a minimum space. Therefore, the primary object of the invention, which is the provision of a vehicle having adequate capacity within extremely limited overall height, is accomplished by cooperation of the various elements that have been described.

We claim as our invention:

1. In a car for coal mine haulage having a wheel-mounted body, a continuous conveyor forming the bottom of the body, and a transverse member supporting the body and arranged below the center of the wheels; a forward conveyor-supporting frame extended over the cross member, a rear conveyor-supporting frame located to the rear of the cross member, the said rear frame being rigidly mounted in the car structure in a substantially horizontal position and at a low level relative to the car, the forward frame being movable about a horizontal pivot point located to the rear of the cross member from a lower position in approximate planar extension of the rear frame to a raised position extended angularly upward from the plane of the rear frame, the said forward frame having in the region of its crossing of the transverse member a longitudinally bent configuration to provide clearance for the cross member when the forward frame is in its lower position.

2. In a car for coal mine haulage a wheel-mounted body outwardly flared from a longitudinally central bottom region, hinged delivery conveyor structure extended along and longitudinally beyond the bottom of the said body, said delivery conveyor structure being hinged intermediate its length and adjacent an end of the vehicle body to deliver material from the said body at a regulable height with respect thereto, independent driving means and connections on each side of the vehicle and operatively connected with the vehicle wheels, the said driving means and connections lying within the outward flare of the said body on both sides thereof, and a hydraulic pressure system organized for steering said vehicle and including a pressure cylinder lying within the outward flare of the body at one side thereof.

EINAR M. ARENTZEN.
ARTHUR L. LEE.